W. H. ARCHER.
SPICE MILL.
APPLICATION FILED JAN. 12, 1911.
1,048,787.
Patented Dec. 31, 1912.
2 SHEETS—SHEET 2.
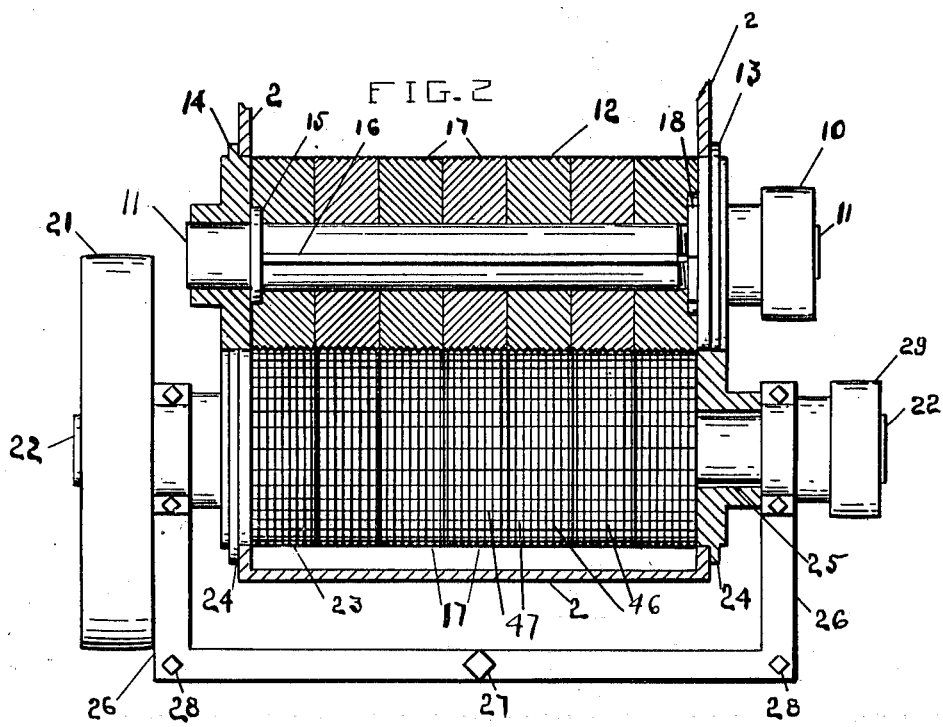
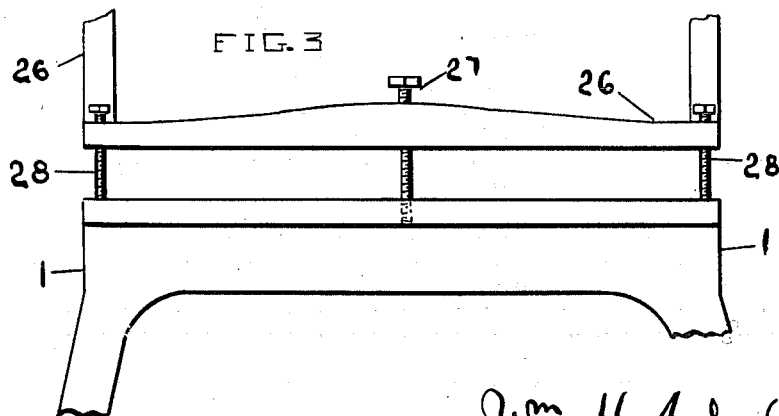

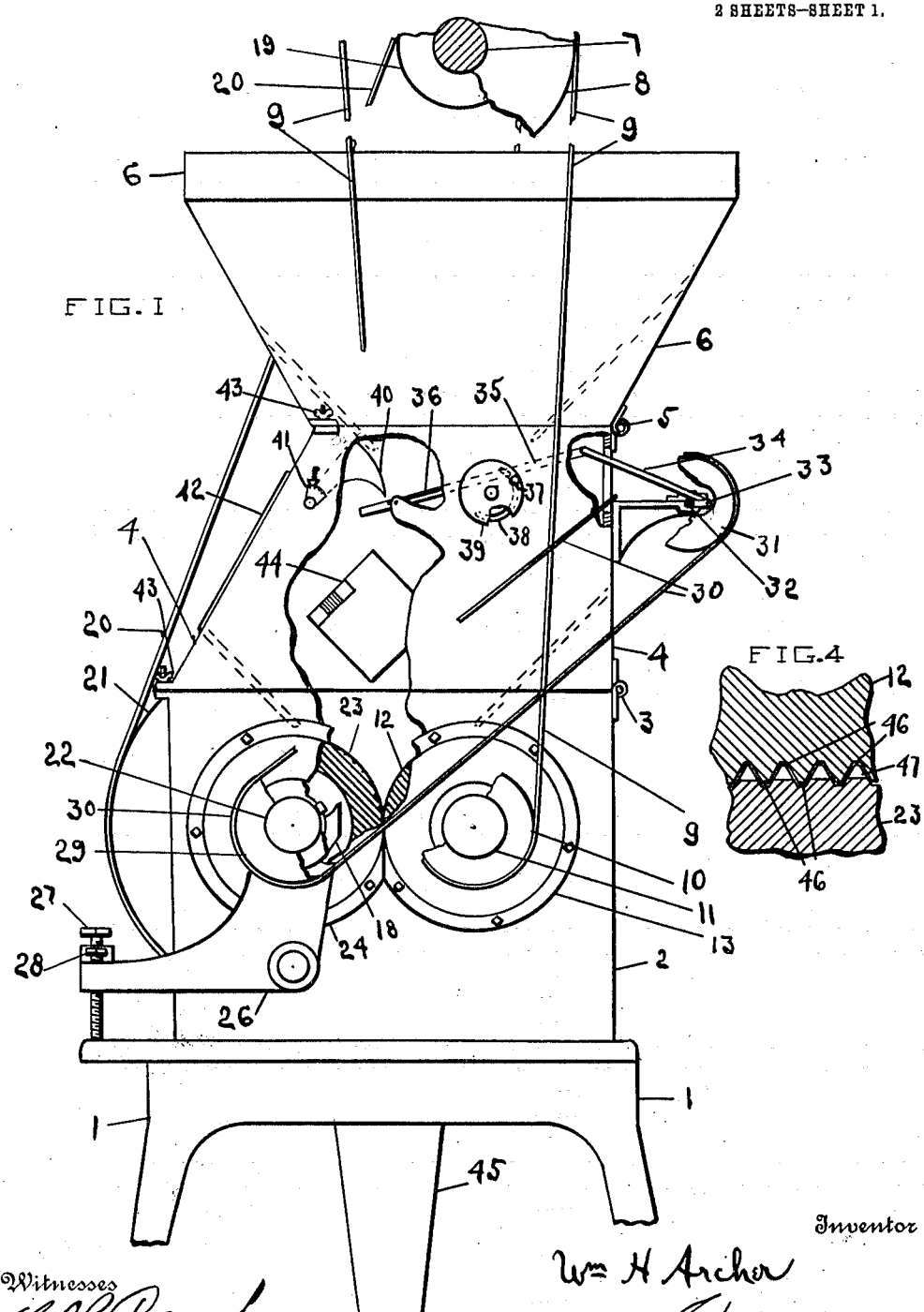

UNITED STATES PATENT OFFICE.

WILLIAM H. ARCHER, OF TOLEDO, OHIO, ASSIGNOR TO ARCHER-KIRK COMPANY, OF TOLEDO, OHIO, A COPARTNERSHIP.

SPICE-MILL.

1,048,787.  Specification of Letters Patent.  Patented Dec. 31, 1912.

Application filed January 12, 1911. Serial No. 602,312.

*To all whom it may concern:*

Be it known that I, WILLIAM H. ARCHER, a citizen of the United States, residing at Toledo, Lucas county, Ohio, have invented new and useful Improvements in Spice-Mills, of which the following is a specification.

This invention relates to a device susceptible of ready up-keep for handling material, especially to effect sub-division thereof.

This invention has utility when embodied in a mill for grinding viscous or oleaginous materials such as certain spices.

Referring to the drawings: Figure 1 is an elevation with parts broken away showing an embodiment of the invention in a spice mill; Fig. 2 is a fragmentary plan view of the rolls with parts in section; Fig. 3 is a front elevation of the roll adjustment; and Fig. 4 is a fragmentary enlarged section of meshing rolls.

Mounted upon the standard 1 is the roll carrying housing section 2 having connected thereto by means of hinge 3 the superposed housing section 4. Mounted upon this superposed housing section 4 and connected thereto by hinge 5 is the hopper 6. The mill may be driven from the overhead line shaft 7 having thereon large drive pulley 8 connected by belt 9 to the small pulley 10 upon the roll shaft 11 carrying the high speed roll 12 mounted in the housing 2 by means of a housing opening filling plate 13 which embodies therein the roll bearing. A similar roll bearing 14 carries the opposite end of this roll shaft 11. Removal of either of these bearings 13 or 14 permits removal of the roll through such opening in the housing, and similarly with this housing opening clear the roll may be introduced into the housing and the roll bearing then placed in position to thus mount the roll in the housing.

Mounted upon the roll shaft 11 is a collar 15, while extending longitudinally therefrom is the key 16 so that the roll sections 17 may be mounted in fixed longitudinal and angular alined position upon the roll shaft 11 against rotation and locked by nut 18 against collar 15 to prevent lateral travel. The collar 15 and nut 18 are disposed in countersunk portions of the terminal sections of the roll.

Mounted upon the drive shaft 7 is the small pulley 19 connected by belt 20 to drive the large pulley 21 upon the movable slow speed roll shaft 22 which carries the roll 23 to oppose the roll 12.

Similar to the closure plates 13, 14, are the housing closure plates 24 which allow of introduction of the roll 23 into the housing 2 as well as provide convenient means for removal of such roll from the housing. These plates 24 have enlarged opening 25 therein to allow of slight relative adjustment of the rolls toward and from each other as effected by the bearing carrying yoke member 26 rockable by adjusting threaded bolt 27 which may be locked as well as leveled up into the various positions of alining by the threaded means 28.

Mounted upon the slow speed roll shaft 22 is the pulley 29 connected by belt 30 to pulley 31 mounted upon shaft 32 having the crank 33 to reciprocate by means of the link 34 the feeder element 35 which has a pin engaged slot 36 to allow of reciprocation below the hopper 6. The direction of reciprocation of this feed element 35 may be adjusted by the pin 37 movable in slot 38 as controlled by the adjusting disk 39. The adjustment of the angle of this feed element 35 is of considerable importance for with some kinds of material tending to cling together a considerable angle of incline is desirable to effect the food at a proper rate, while with other materials this direction should approximate a horizontal as when the stock may be, say, pepper berries.

Besides varying the angle of inclination of the feed element 35 the rate of feed may be varied by adjusting the height of the opening from this reciprocable element 35 as controlled by the element 40 rocked and locked in various adjusted positions as held by the clip 41. The front portion of the housing section 4 is shown as provided with a transparency as a plate of glass 42 so that inspection may be had at any time to determine the condition of material flow in the mill to the rolls.

To release the hinged hopper 6 as well as the hinged housing section 4, wing bolts 43 are provided. The spill from the reciprocable element 35 is shown as upon an incline including an electro-magnet 44 effective to extract from the stock any iron or steel, such as nails, to prevent their passage upon and injury of the rolls. The window 42 is convenient for observation as to whether or not such metallic substance have been stopped at this electro-magnet incline 44. The spill from the rolls may be through spouting 45.

The rolls are shown as having peripheral grooves 46 with the intermediate ribs of the opposite roll in mesh therewith, while longitudinally of these rolls and of little less depth than these peripheral grooves are the longitudinal grooves 47. Between each pair of grooves 46 the rib forms independent teeth which together constitute a circumferential series, while similarly between each pair of grooves 47 the rib forms independent teeth which together constitute longitudinal series. These longitudinal grooves serve to engage the stock and carry it between the roll faces, while the peripheral grooves in mesh with each other traveling at the different rates of one roll as to the other are effective to serve as self cleaners to thoroughly remove the material from the rolls as well as sub-divide the material in this process. This makes possible a grinding of stock of oily or gummy nature by rolls at a continuous operation and producing a uniform grading of product without removal therefrom of the valuable essential oil constituents which has not heretofore been possible in the stamp mill process. One operation will produce a sixty per-cent. product to pass through a forty mesh to the inch screen and the tailings over is uniform for a re-grinding.

Should it be found desirable to sharpen the rolls, this may be quickly and conveniently accomplished by throwing the rolls 12, 23, into close meshing relation and spill thereon a little emery dust and oil and the peripheral grooves will grind into each other to sharpen up the teeth. The hinging of the hopper section as well as the housing section 4 allows of ready access to the various parts of the mill for cleaning of materials therefrom when it is desired to change from one stock to the other, as, say, from ginger, mace, nutmeg, to cinnamon or Cayenne pepper.

In handling of material of the character described, hard cutting teeth of fineness are desirable and in the production thereof it is convenient to take soft steel, shape it up and then harden it. This operation brings about a distortion in the roll, precluding production of a structure in any wise suitable for even approximating the fine degree of subdivision necessary in practice. The boring of the stock seems to relieve internal stress tending to cause it to warp or re-shape, while the hardening sometimes affects the configuration more or less. However, by building up the roll in sections these sections may be of such size as to eliminate the objectionable distortions of said boring and case hardening and still allow of the production of a roll having the hard sharp teeth of tough material. Furthermore the making of the rolls in sections allows the replacement of an injured section, say, when it has been injured by the action of some hard substance passing the incline 44.

What is claimed and it is desired to secure by Letters Patent is:

1. In a machine of the class described, a pair of rolls, each roll having a series of circumferential grooves which form spaced annular ribs, said ribs having a series of longitudinal beveled grooves which are of less depth than the circumferential grooves, the bottoms of said longitudinal grooves being parallel with the plane of the axis of the roll, the difference in depth between the circumferential and longitudinal grooves leaving the walls of the circumferential grooves with uninterrupted surfaces below the plane of the bottom of the longitudinal grooves, the ribs of one roll fitting snugly and revolving in the circumferential grooves of the adjacent roll.

2. A mill for finely dividing oleaginous material, said mill comprising opposing rolls including similar transverse sections, said sections having longitudinal grooves with intermediate ribs to feed the material continuously between said rolls, said sections also each provided with a plurality of fine circumferential grooves and intermediate ribs intersecting said longitudinal grooves and ribs, said circumferential grooves of one roll interfitting with the ribs of the opposing roll to finely divide the material drawn between the rolls by the longitudinal ribs and serving by their interfitting to clear the intersecting ribs and grooves of said rolls of the oleaginous material during continuous operation, the line of action upon the material between the rolls being continuously interrupted by the fine circumferential ribs.

In testimony whereof I affix my signature in the presence of two witnesses.

WILLIAM H. ARCHER.

Witnesses:
 Geo. E. Kirk,
 Gladys Jameson.